(12) United States Patent
Sharp et al.

(10) Patent No.: US 7,380,272 B2
(45) Date of Patent: May 27, 2008

(54) SYSTEM AND METHOD FOR DETECTING AND ELIMINATING IP SPOOFING IN A DATA TRANSMISSION NETWORK

(75) Inventors: Clifford F. Sharp, Del Mar, CA (US); Susan Pittman Dark, Dallas, TX (US)

(73) Assignee: Deep Nines Incorporated, Dallas, TX (US)

( * ) Notice: Subject to any disclaimer, the term of this patent is extended or adjusted under 35 U.S.C. 154(b) by 1138 days.

(21) Appl. No.: 10/078,386

(22) Filed: Feb. 20, 2002

(65) Prior Publication Data

US 2003/0110394 A1    Jun. 12, 2003

Related U.S. Application Data

(63) Continuation-in-part of application No. 09/875,319, filed on Jun. 6, 2001, now Pat. No. 6,930,978, which is a continuation-in-part of application No. 09/572,112, filed on May 17, 2000, now Pat. No. 7,058,976.

(51) Int. Cl.
*G06F 17/00* (2006.01)

(52) U.S. Cl. ............... 726/11; 726/13; 726/14

(58) Field of Classification Search ............ 726/13, 726/27, 2, 3, 11, 14; 710/100; 709/235; 718/105; 711/170
See application file for complete search history.

(56) References Cited

U.S. PATENT DOCUMENTS

| | | | |
|---|---|---|---|
| 5,319,776 A | 6/1994 | Hile et al. | |
| 5,414,650 A | 5/1995 | Hekhuis | |
| 5,557,742 A | 9/1996 | Smaha et al. | |
| 5,623,601 A | 4/1997 | Vu | |
| 5,649,095 A | 7/1997 | Cozza | |
| 5,787,253 A | 7/1998 | McCreery et al. | |
| 5,799,002 A | 8/1998 | Krishnan | |
| 5,828,846 A | 10/1998 | Kirby et al. | |
| 5,835,726 A | 11/1998 | Shwed et al. | |
| 5,913,041 A | 6/1999 | Ramanathan et al. | |

(Continued)

FOREIGN PATENT DOCUMENTS

JP        05-227216        9/1993

(Continued)

OTHER PUBLICATIONS

A graph-based methodology for analyzing IP spoofing attack Voravud Santiraveewan; Permpoontanalarp, Y.; 18th International Conference on Advanced Information Networking and Applications, 2004. AINA 2004. vol. 2, 2004 pp. 227-230 vol. 2.*

(Continued)

*Primary Examiner*—David Y Jung
(74) *Attorney, Agent, or Firm*—Fulbright & Jaworski LLP

(57) ABSTRACT

A traffic management system sniffs data arriving at any point in a system. The sniffer operates to extract certain data from each address. This data could be, for example, the IP address data and the physical address data. The extracted data is then used to access different data bases to determine if matches occur. Time stamps, sequencing and other parameters of each piece of data entering a system are used to control data access.

10 Claims, 8 Drawing Sheets

U.S. PATENT DOCUMENTS

| | | | |
|---|---|---|---|
| 5,919,258 | A | 7/1999 | Kayashima et al. |
| 6,052,788 | A | 4/2000 | Wesinger, Jr. et al. |
| 6,061,798 | A | 5/2000 | Coley et al. |
| 6,098,172 | A | 8/2000 | Coss et al. |
| 6,119,165 | A | 9/2000 | Li et al. |
| 6,119,236 | A | 9/2000 | Shipley |
| 6,182,226 | B1 | 1/2001 | Reid et al. |
| 6,205,551 | B1 | 3/2001 | Grosse |
| 6,219,768 | B1 | 4/2001 | Hirabayashi et al. |
| 6,219,786 | B1 | 4/2001 | Cunningham et al. |
| 6,222,856 | B1 | 4/2001 | Krishnan et al. |
| 6,246,687 | B1 | 6/2001 | Siu |
| 6,253,337 | B1 | 6/2001 | Maloney et al. |
| 6,263,444 | B1 | 7/2001 | Fujita |
| 6,275,942 | B1 | 8/2001 | Bernhard et al. |
| 6,279,113 | B1 | 8/2001 | Vaidya |
| 6,298,445 | B1 | 10/2001 | Shostack et al. |
| 6,301,668 | B1 | 10/2001 | Gleichauf et al. |
| 6,321,336 | B1 | 11/2001 | Applegate et al. |
| 6,327,625 | B1 | 12/2001 | Wang et al. |
| 6,370,648 | B1 | 4/2002 | Diep |
| 6,513,122 | B1 | 1/2003 | Magdych et al. |
| 6,550,012 | B1 | 4/2003 | Villa et al. |
| 6,598,034 | B1 | 7/2003 | Kloth |
| 6,615,358 | B1 | 9/2003 | Dowd et al. |
| 6,711,127 | B1 | 3/2004 | Gorman et al. |

FOREIGN PATENT DOCUMENTS

| | | | |
|---|---|---|---|
| JP | | 08 186569 | 7/1996 |
| JP | | 10-233-779 | 9/1998 |
| WO | | WO/0003467 | 1/2000 |
| WO | | WO 00/11841 | 3/2000 |
| WO | | WO/0034867 | 6/2000 |
| WO | | WO 01/13589 | 2/2001 |
| WO | | WO 01/16664 | 3/2001 |

OTHER PUBLICATIONS

Defending Against TCP SYN Flooding Attacks Under Different Types of IP Spoofing Wei Chen; Dit-Yan Yeung; International Conference on Networking, International Conference on Systems and International Conference on Mobile Communications and Learning Technologies, 2006. ICN/ICONS/MCL 2006. International Conference on Apr. 23-29, 2006 pp. 38-38.*

Defense Against Spoofed IP Traffic Using Hop-Count Filtering Haining Wang; Cheng Jin; Shin, K.G.; IEEE/ACM Transactions Networking. vol. 15, Issue 1, Feb. 2007 pp. 40-53.*

Japanese Examination Report issued for JP 2003-501,888; dated Mar. 28, 2006.

Schnackenberg et al., "Infrastructure for Intrusion Detection and Response", Proceedings fo the DARPA Information Survivability Conference and Exposition (DISCEX) 2000, held in Hilton Head, S.C., Jan. 25-27, 2000, 9 pgs.

Zilka, Kevin, Protest Under 37 C.F.R. 1.291(a), In re application of: Susan P. Dark, U.S. Appl. No. 09/572,112, date Mar. 25, 2005, 3 ppgs.

Zilka, Kevin, Protest Under 37 C.F.R. 1.291(a), In re application of: Susan P. Dark, U.S. Appl. No. 09/572,112, date Mar. 25, 2005, Appendix A, 7 ppgs.

Zilka, Kevin, Protest Under 37 C.F.R. 1.291(a), In re application of: Susan P. Dark, U.S. Appl. No. 09/572,112, date Mar. 25, 2005, Appendix B, 19 ppgs.

Zilka, Kevin, Protest Under 37 C.F.R. 1.291(a), In re application of: Susan P. Dark, U.S. Appl. No. 09/572,112, date Mar. 25, 2005, Appendix C, 25 ppgs.

Zilka, Kevin, Protest Under 37 C.F.R. 1.291(a), In re application of: Susan P. Dark, U.S. Appl. No. 09/572,112, date Mar. 25, 2005, Appendix D, 12 ppgs.

Zilka, Kevin, Protest Under 37 C.F.R. 1.291(a), In re application of: Susan P. Dark, U.S. Appl. No. 09/572,112, date Mar. 25, 2005, Appendix E, 12 ppgs.

Zilka, Kevin, Protest Under 37 C.F.R. 1.291(a), In re application of: Susan P. Dark, U.S. Appl. No. 09/572,112, date Mar. 25, 2005, Appendix F, 8 ppgs.

Zilka, Kevin, Protest Under 37 C.F.R. 1.291(a), In re application of: Susan P. Dark, U.S. Appl. No. 09/572,112, date Mar. 25, 2005, Appendix G, 7 ppgs.

Zilka, Kevin, Protest Under 37 C.F.R. 1.291(a), In re application of: Susan P. Dark, U.S. Appl. No. 09/572,112, date Mar. 25, 2005, Appendix H, 10 ppgs.

Zilka, Kevin, Protest Under 37 C.F.R. 1.291(a), In re application of: Susan P. Dark, U.S. Appl. No. 09/572,112, date Mar. 25, 2005, Appendix I, 11 ppgs.

Zilka, Kevin, Protest Under 37 C.F.R. 1.291(a), In re application of: Susan P. Dark, U.S. Appl. No. 09/572,112, date Mar. 25, 2005, Appendix J, 5 ppgs.

Zilka, Kevin, Protest Under 37 C.F.R. 1.291(a), In re application of: Susan P. Dark, U.S. Appl. No. 09/572,112, date Mar. 25, 2005, Appendix K, 23 ppgs.

Nikkei Communications, Oct. 18, 1999, No. 304, p. 101-109, p. 185.

Nikkei Open Systems, Jan. 15, 2000, No. 82, p. 100-103, p. 321.

Japanese Office Action issued for Japanese Patent Application No. 2001-585,449 dated Sep. 6, 2005.

Ishibashi, H. et al. "A Protection Method against Unauthorized Access and Address Spoofing for Open Network Access System." IEEE, US, vol. 1 of 2. Conf. 8, Aug. 26, 2001, pp. 10-13.

Kanlayasiri, Urupoj, et al. "Detecting Denial of Service using BENEF Model: An Alternative Approach." Applied Network Research Group Department of Computer Engineering, Kasetsart University, Chatuchak, Bangkok, Thailand, Feb. 2001, pp. 1-8.

Whalen, Sean, An Introduction to Arp Spoofing. Revision 1, Apr. 2001, pp. 1-6.

"IP-Spoofing Demystified." Phrack Magazine, vol. 7, Issue 48, File 14 of 18, Jun. 1996, pp. 1-9.

"Sleuth9." Datamation, [on-line] http://products.datamation.com/security/security/1011891069.html, retrieved on May 7, 2003. pp. 1&2.

Partial International Search Report, dated May 26, 2003.

PCT International Search Report (PCT/US02/17426) dated Feb. 28, 2003.

PCT Search Report dated Mar. 26, 2002 (PCT/US01/15108).

* cited by examiner

| 0 | 1 | 2 | 3 | 4 | 5 | 6 |
|---|---|---|---|---|---|---|
| MAIN POSIX PTS 2 | IP1 | CRUNCH | DETER CHOKE | WISH SUM LOWER | 2 DATABASE FILTERS | SYNCH SHARED RESOURCES |

FIG. 7

| | BYTES | BYTESPTS | BYTESLASTPTS | ACCUMBYTESLAST | IPDETECTIONDATE | IPLASTNOTICEDATE |
|---|---|---|---|---|---|---|
| 1 | 1,107,624 | 40 | 40 | 18,107,624 | 2/14/01 10:14:15 AM | 2/14/01 2:37:27 AM |
| 2 | 1,074,749 | 999 | 999 | 1,074,749 | 2/14/01 10:15:01 AM | 2/14/01 2:42:15 AM |
| 3 | 833,551 | 41 | 41 | 833,551 | 2/14/01 10:13:46 AM | 2/14/01 2:44:55 AM |
| 4 | 477,808 | 71,379 | 71,379 | 447,808 | 2/14/01 10:10:26 AM | 2/16/01 10:48:49 AM |
| 5 | 300,426 | 38,015 | 38,015 | 300,426 | 2/14/01 2:30:48 AM | 2/14/01 2:30:51 AM |
| 6 | 201,787 | 43,830 | 43,830 | 201,787 | 2/14/01 10:08:36 AM | 2/16/01 10:48:34 AM |
| 7 | 69,169 | 2,950 | 2,950 | 69,169 | 2/14/01 10:10:25 AM | 2/16/01 10:45:55 AM |
| 8 | 54,450 | 80 | 80 | 54,450 | 2/14/01 11:18:14 AM | 2/14/01 12:19:57 PM |
| 9 | 52,471 | 5,665 | 5,665 | 52,471 | 2/14/01 10:08:38 AM | 2/16/01 10:48:35 AM |
| 10 | 30,118 | 2,170 | 2,170 | 30,118 | 2/14/01 12:35:00 PM | 2/14/01 12:50:22 PM |

| | CHOKEBYTES | CHOKELEVEL | ACTIVE | CHOKESTARTDATE | CHOKEENDDATE |
|---|---|---|---|---|---|
| 1 | 9,325 | 2 | 0 | 2/14/01 10:17:24 AM | 2/14/01 10:37:22 AM |
| 2 | 40,425 | 2 | 2 | 2/14/01 10:17:30 AM | 2/14/01 10:37:22 AM |
| 3 | 137,276 | 2 | 0 | 2/14/01 10:17:39 AM | 2/14/01 10:37:22 AM |
| 4 | 23,336 | 2 | 0 | 2/14/01 10:17:47 AM | 2/14/01 10:37:22 AM |
| 5 | 1,540 | 2 | 0 | 2/14/01 10:17:52 AM | 2/14/01 10:37:22 AM |
| 6 | 40 | 2 | 0 | 2/14/01 10:17:58 AM | 2/14/01 10:37:22 AM |
| 7 | 46,519 | 2 | 0 | 2/14/01 10:18:03 AM | 2/14/01 10:37:22 AM |
| 8 | 118,529 | 2 | 0 | 2/14/01 10:18:14 AM | 2/14/01 10:37:22 AM |
| 9 | 148,551 | 2 | 0 | 2/14/01 10:18:21 AM | 2/14/01 10:37:22 AM |

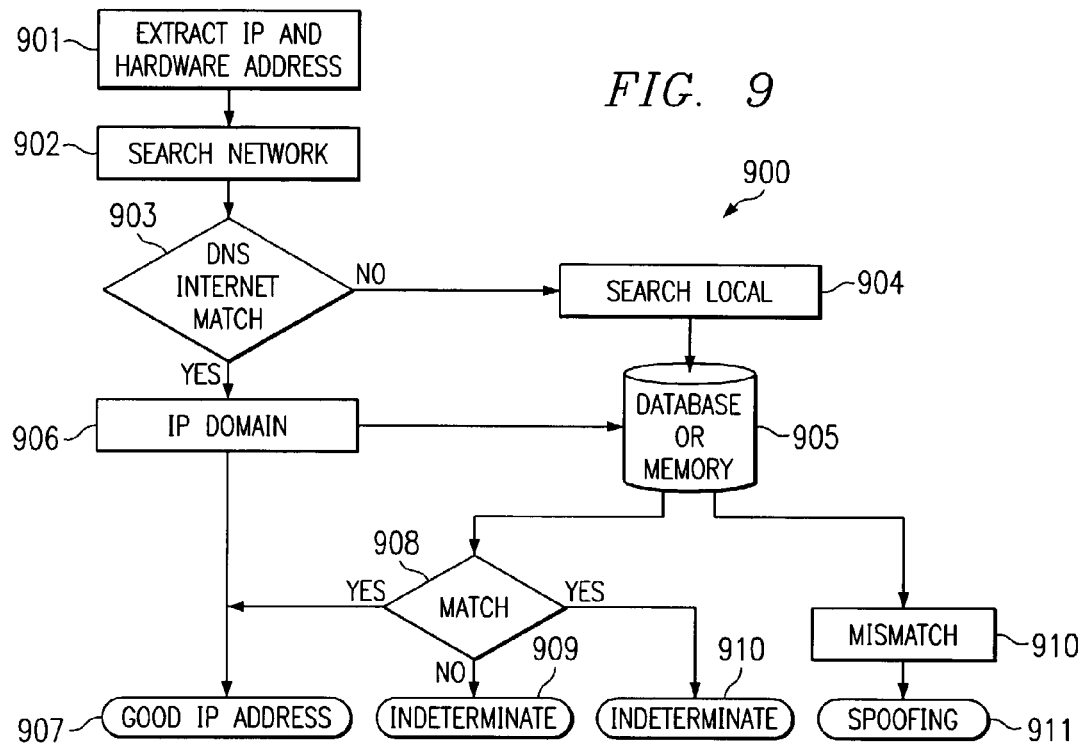

US 7,380,272 B2

SYSTEM AND METHOD FOR DETECTING AND ELIMINATING IP SPOOFING IN A DATA TRANSMISSION NETWORK

CROSS-REFERENCE TO RELATED APPLICATIONS

This application is a Continuation-in-Part of U.S. patent application Ser. No. 09/875,319, filed Jun. 6, 2001, now U.S. Pat. No. 6,930,978 which is a Continuation-in-Part of U.S. patent application Ser. No. 09/572,112 filed May 17, 2000, now U.S. Pat. No. 7,058,976 and entitled "Intelligent Feedback Loop Process Control System," both of which are hereby incorporated herein by reference.

BACKGROUND OF THE INVENTION

This invention relates to data network control systems and more particularly to a system and method for monitoring and filtering traffic to maintain a constant stream of data flowing in and/or out of a particular location and more particularly to a system and method for detecting and protecting against IP spoofing.

Data flow in and out of a data processing location is vital to the proper operation of many enterprises. When this data flow is interrupted, even for the briefest of intervals, a major problem exists. One way to interrupt such data flow is by flooding any communication line (or any network device on the pathway) with so many data packets that the device simply clogs and ceases to function properly. In such a situation, data can be lost, transactions not completed and the flow of commerce halted.

Companies are getting attacked via data flooding by a wide range of flooding mechanisms, including certain types of Denial of Service (DOS) and Distributed Denial of Service (DDOS) attacks that are not specific to an application, but exist in the network.

One known solution to this particular type of problem is manual intervention by a system administrator scrolling on access control list screen to manually select and block an offending IP address.

This, of course, presupposes that the operator even knows which sending IP address(es) is causing the problem. If the rogue sending address and/or addresses keep changing, the operator (network administrator) is at a loss. There are today remote intrusion detection sensors that provide manual notification that an attack has been detected and lists the known offending IP address. A third solution is remote monitoring of network conditions. The problem with the solutions to date is the fact that by the time a human can respond to the existing condition, it is already beyond his/her ability to control the traffic and the network is brought down by the intruding traffic overload.

For example, even assuming a modest speed of, let's say a 1,000 packet/second, about half of the maximum data rate of a T1 channel, the human eye cannot respond that fast to read the IP addresses, digest the information and act before many, many packets enter the system and cause damage. Typical enterprise can receive a million hits in an hour, made up of perhaps 4,000,000 or 5,000,000 packets. Such large numbers of packets, when backed up, cause the system to stop functioning.

Another type of attack on a network is IP Spoofing where one computer assumes the identify (IP address) of another computer for a period of time. Usually, the computer which has had its IP address "spoofed" is not even aware of the spoofing.

Ethernet NIC cards in computers have both a hardware address and a software address. The software address is called the TC/IP address, which can be thought of as the commonly known address. If the ethernet card in a computer were to be thought of as a house, the mailing address would be the TC/IP address. The physical address of that house could also be stated in terms of coordinates on a plat map showing where the house is physically located. Deeds to homes usually speak in terms of "Legal Description", i.e., a certain lot in a certain block on a certain plot map. The rest of us refer to a house by its mailing address. Spoofers randomly generate IP addresses (the software and TC/IP address) from their computer, or they change their IP address in the computer to the IP address of a target computer from which they want to steal or generate traffic, since most systems respond to TC/IP address.

BRIEF SUMMARY OF THE INVENTION

The present invention is directed to a system and method which includes several techniques that are used to detect and prevent spoofing. One technique is to use the MAC or hardware address on every Ethernet card that's burned into the card and compare that address to the IP address to see if a match condition exists in a particular database. This is akin to matching the "Legal Description" against the mailing address of each sent letter before delivering that letter to a destination. In operation, the system would store hardware and software addresses as they are generated. When a new packet arrives it is checked against a validity database. If suddenly the hardware address and the IP address doesn't match, then the system knows that there is a high probability that an address is being spoofed.

Another technique is to send requests to the domain name server tables throughout the Internet to validate whether an IP address exists in the tables. If the answer comes back saying, "No, it's not in our tables," there again is a high probability that the system is dealing with a spoofed address.

Another technique is to use the ID numbers contained in the IP header of packets arriving at or leaving a destination. As computers are exchanging data, these ID numbers get advanced higher and get exchanged so both computers (the sender and the receiver) know the sequence of data packet addresses arriving at or leaving. If suddenly, the expected sequence of numbers follows some unexpected sequence, there again is a high probability that the system is dealing with an invalid packet.

One embodiment of this invention includes a system which implements a three tiered architecture where the database runs on one computer, or across multiple computers, and the kernel and all of its intelligence runs on a separate computer while the applications and management tools run on other computer(s). The system is designed to monitor every TCP/IP packet directed toward a company and to keep track of each packet from each IP address, including all of the bytes of information associated with each packet. The goal of the system and method is to prevent flooding which is defined as a threshold above which data throughput or packet throughput must not go.

If desired, the system can have several threshold's, each dynamically changeable, when a threshold is reached. Threshold, in this context, means that the number of arriving data packets and the accumulated number of bytes of information during a preset time period, (called a primary time slice (PTS)) has met a limit. When this happens certain packets are scanned, captured, and prevented (temporarily) from passing through the system. When the traffic rate falls to the threshold level these captured packets are allowed to then flow through the system. The captured packets are selected based on a comparison of information "sniffed" by the monitor against certain criteria, such as number of packets and the accumulation of bytes per PTS coming from a particular IP address; a known "bad" IP address; and known bad data patterns.

Generally, when it comes to flooding, there are four (or more or less) threshold levels which exist which are percentages of the total maximum band-width of the network. The thresholds can be for example 20, 30, or 40 percent of maximum. If the traffic flow is under the lowest threshold, everything runs smoothly. Once the number of arriving packets and/or accumulated bytes violate a threshold, the system begins, automatically, the process of choking or holding certain packets and sends alarms and notifications to predetermined lists of people. If higher thresholds are violated then more and more severe action is taken, i.e., more and more packet(s) are prevented from flowing through the system and additional alarms and notifications are sent.

One embodiment of the system includes several real time displays, or tools, to analyze, manage, and monitor the data bases, the kernel, and the whole system. One visual display of data and addresses shows the packets that have been choked and, optionally could show why. This information can be displayed locally and can be communicated remotely to any terminal or communication device anywhere in the world. Thus, a user, operating from any terminal with the appropriate user ID and password can make adjustments to the system by changing the different parameters allowing more or less data flow. The operator can, if desired, adjust the criteria for choking data.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 4 shows a seven threads of the system working interactively;

FIGS. 5-8 show various displays used to monitor system operation;

FIG. 9 shows a flow chart of the use of a central registry for spoofing detection; and FIGS. 10 and 11 show flow charts of the use of a time stamp or sequencing system for spoofing detection.

DETAILED DESCRIPTION OF THE INVENTION

Figure 1:
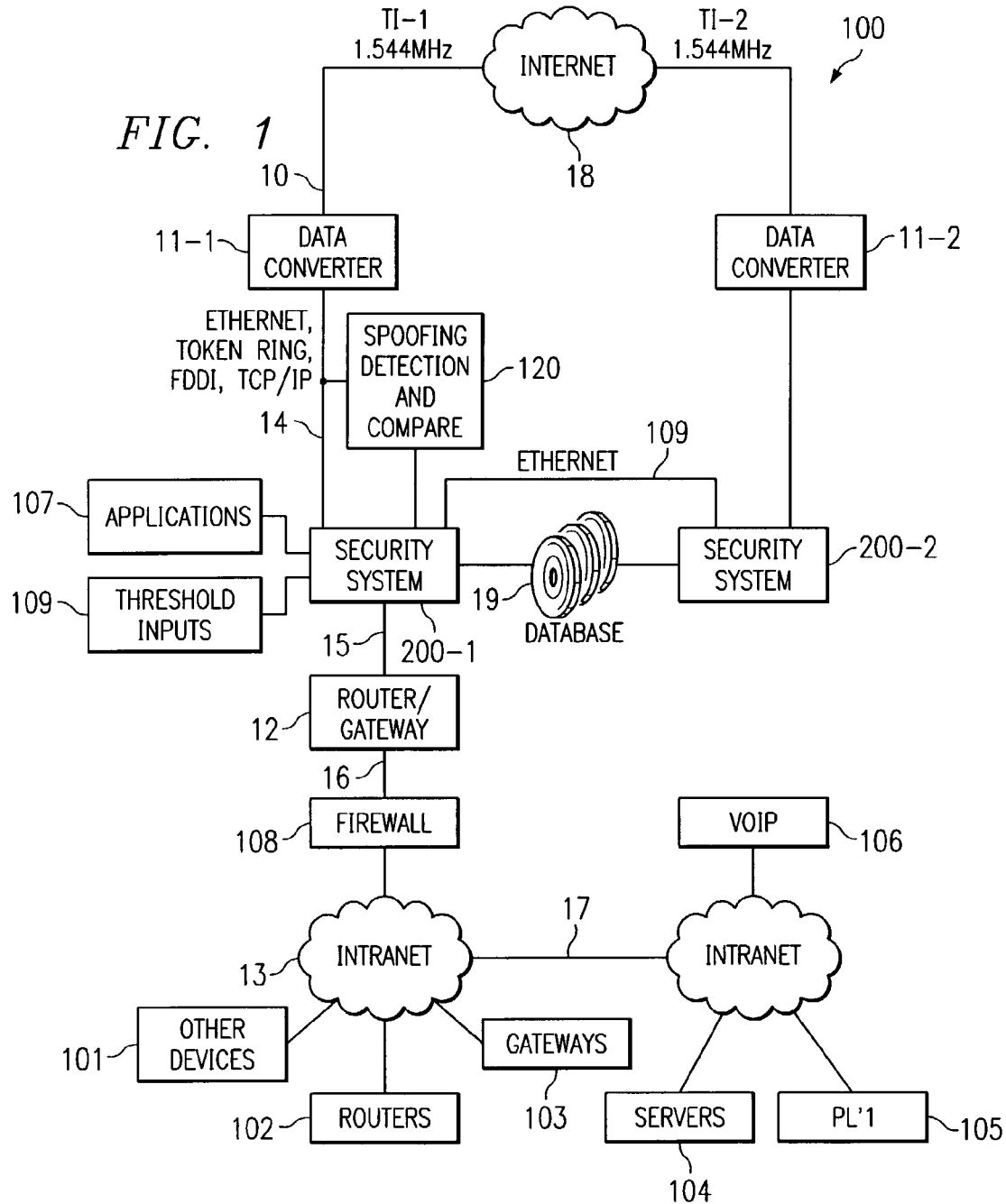
FIG. 1 shows the invention working in context to data flowing to/from a network, such as the internet.

Turning now to FIG. 1, as packets come from internet 18 (or any source), they travel to data converter 11-1 (11-2) through line 10, which could be a T1, T3, OC48 or any other communication media. Data converter 11-1 can be several data converters which take the data packets off the line and convert that data to an "internal" protocol, such as token ring, FDDI, TCP/IP or other protocol desired by an enterprise. These packets then pass to security system 200-1 one medium 14. When the packets arrive at security system 200-1, each packet will be analyzed, as will be discussed hereinafter. Only those medium packets which make their way through security system 200-1 are delivered to router 12 over 15. Router 12 could be a combination router/gateway or, in fact, router 12 and/or firewall 108 could be built directly into security system 200-1 if so desired.

If desired, a spoofing detector and control 120 can be added to applications 107 or could be stand alone (as shown) and can be added where desired prior to intranet 13. Also, one or more controls 120 could, if desired, be placed after intranet 13 to internally protect the network. The operation of control 120 will be detailed hereinafter with respect to FIGS. 9, 10 and 11.

Those packets that manage to make it through security system 200-1 are delivered to enterprise internal (intra) network 13, firewall 108. Connected to intranet 13 can be other intranets, local or remote. For example, intranet 13-N is connected to intranet 13 via medium 17. Connected to any of the intranets can be any type of device such as routers 102, gateways 103, servers 104, PCs 105, voice-over IP, protocol systems (VOIP) 106, or any type of devices 0.01.

The system is designed having a back up line T1-2 so that, if the user desires, information is always delivered from the external network for example from internet 18, over data lines T1 and T2. The packets that come via T1-2 are processed in a similar way as those coming via T1-1, except they do not pass through security system 200-2 until security system 200-2 gets notified that security system 200-1 is not functioning or overloaded. In such an event the information stops flowing from T1-1 and starts flowing from T1-2. This is a back-up system and security systems 200-1 and 200-2 can, for example, communicate with each other over medium 109. Database 19 advantageously is connected to both systems 200-1 and 200-2 and is used to store the information analyzing every packet that comes via T1-1 or T1-2.

Applications 107 can be remote from security systems 200-1 and 200-2 if desired and, connected via intranet 13, or they can be local to security system 200-1. The preferred arrangement would be for applications 107 to be in a separate CPU from the one processing system 200-1. They can be run from a location via internet 18 if needed. In that case, the information would come in on modem T1-1 and T1-2 as any other information would come in to the system.

This, as will be discussed, allows a user to remotely access the system, monitor the system and make changes to the system as desired.

Data from applications 107 is advantageously binary encrypted so when it's run from anywhere, it is difficult to decrypt. As data flows into security system 200-1 (200-2) the packets are analyzed and do not pass to router/Gateway 12 unless they are logged through the system as will be discussed hereinafter.

Figure 2:
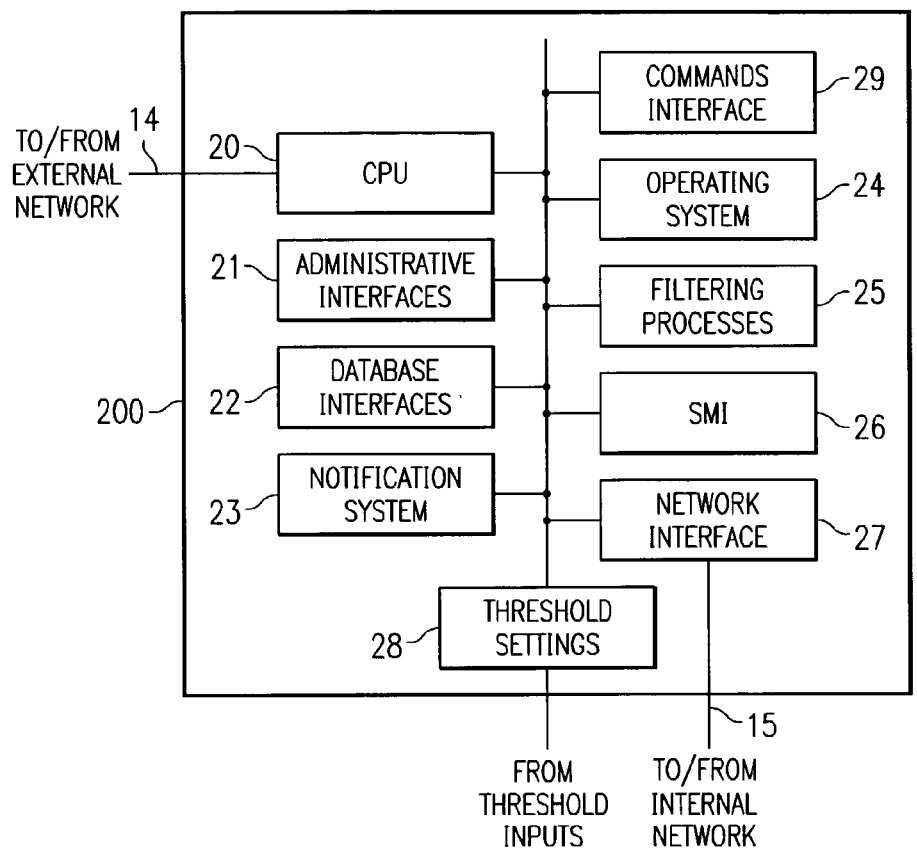
FIG. 2 shows in detail the basic blocks which enable the invention.

FIG. 2 shows a block diagram, by way of example only, of security system 200: Data enters, via medium 14, to CPU interface 20, which advantageously could be a Sun Ultra Computer running operating system 24 which could be Solaris 8. Administrative interfaces 21 in our example are four visual displays; two of which are data base driven and the other two being visual displays of the kernel in real time. Data base interfaces 22 are, in our example, Oracle 8i version 8.1.7.0.0, and contain a number of tables based on Oracle 8 architecture. Notification system 23 is an alarming system that involves sending out e-mail and pager alerts as packets get analyzed and choked. Filtering processes 25 are Solaris 8 loadable kernel modules that actually filter or disallow packets from passing through the system. SMI 26 is self-monitoring intelligence that is continuously monitoring the complete state of security system 200-1 (200-2). Network interface 27 processes data packets to external interface 15 using Sun Fast Ethernet PCI NIC Internet access. Notification system 23 sends pages, e-mail and/or any other message type, advantageously via the SMTP protocol through external interface 14 using, for example the Sun Solaris Mailx program. Threshold settings control 28 allows for fixed and variable settings.

Commands interface is a Unix shell and/or DOS shell command line interface to the system. Interface allows external issue of commands that change the internal configuration parameters of the system. Along with changing the internal configuration, the configuration database is updated simultaneously and automatically. The following is a partial list of configuration items that can be altered:

Status—tells the system to list all the configuration items that can be altered and their current status Email—turn on/off email alerts;

Pager—turn on/off pager alerts;

Iptrack—turn on/off writing to the iptrack database;

Ipchoke—turn on/off writing to ipchoke database;

Ipicmp—turn on/off writing to ipiemp database;

Message—turn on/off message, log reporting and change the message reporting level;

Trace—turn on/off error log reporting and alter the trace level reporting

Ptslice—modify the PTS period; and

Threshold s 1-4—turn on/off each threshold level.

Figure 3:
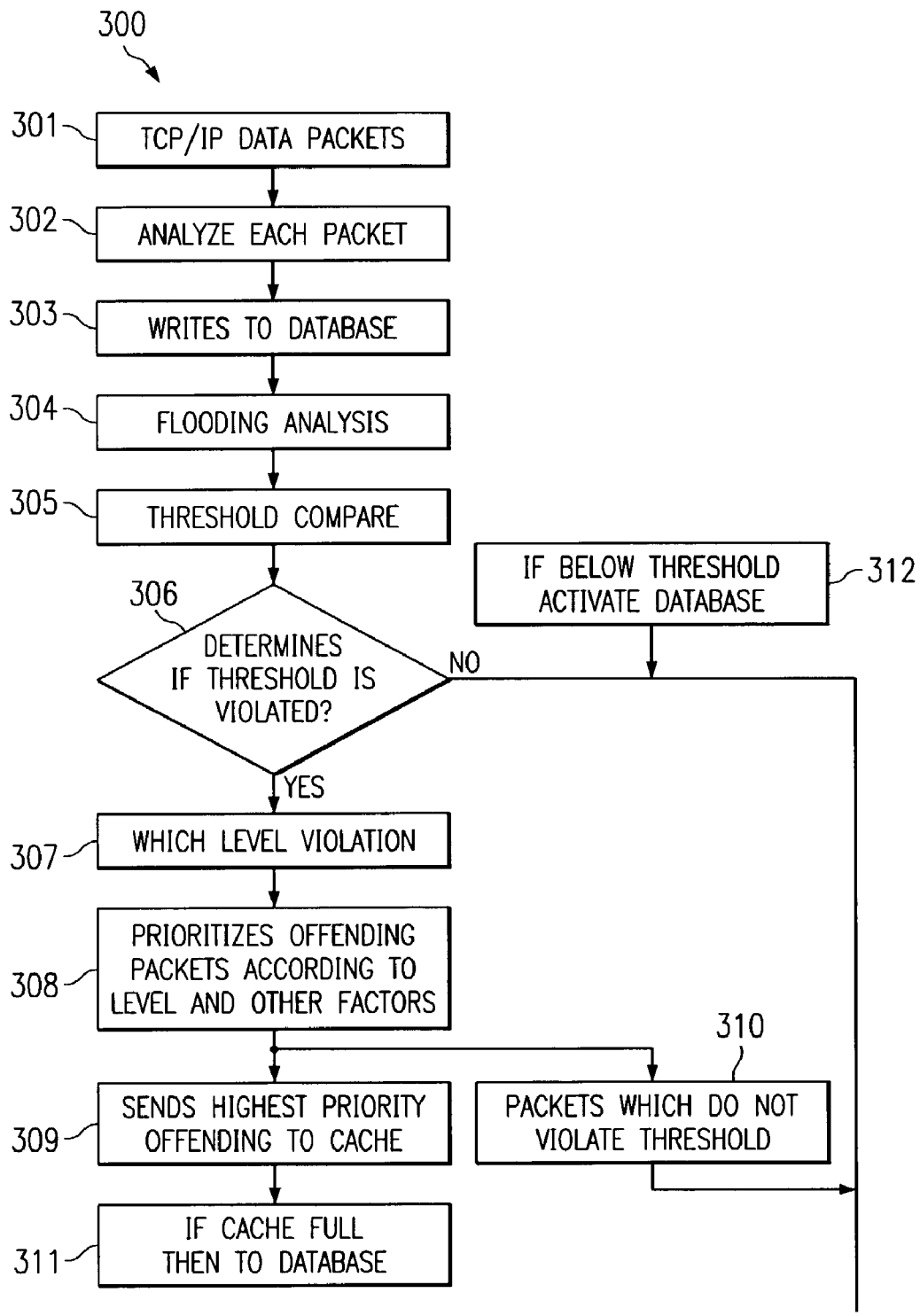
FIG. 3 shows a flow diagram of the system operation.

FIG. 3 shows system diagram 300. Packets enter via box 301 via medium 14 (FIG. 2) and each packet is analyzed. Routine 302 looks at the packet to see if the IP address of the packet has sent any previous bad information. Also a tally is maintained in database 19 (FIG. 1) of how many bytes each packet contains and the number of bytes of the packet is added to the total for that same IP address. The system also keeps track of how the packet size fits with respect to the maximum packet size of the other incoming data. Also tallied are the amount of bytes since the last primary time slice (PTS) has been stored along with, the accumulated bytes for the whole time the system has been running for that IP address. The date when an IP address first sent a packet through the system, along with the date of the last packet is maintained along with the current number of bytes for that PTS all of which are stored in database 19 via routine 303.

Analysis 304 involves determining if the number of packets and the accumulated bytes per IP address over each PTS, taken as a whole, is enough to violate any of the four preset threshold levels.

Analysis 304 also determines, on a continuous basis, if the packet byte accumulation rates warrant the addition or subtraction of IP addresses to the list of chokes as compared to each threshold level and preset packet rate.

Threshold compare 305, compares the number of bytes during the last PTS where it first sorts the total number of bytes to each IP address by descending number of bytes. In other words, the highest number of bytes by IP address gets sorted to the top. If the threshold has been violated box 306, if the total number of bytes that came through for all IP addresses during that PTS is greater than one (or more) of the threshold levels or if the packet rate violates a preset packet rate threshold. When a level of violation happens, 307 a determination is made as to which level has been violated. If any threshold is violated, then certain data packets are choked from flowing through the system.

Once a threshold is violated the system begins to disallow packets from certain IP addresses to pass through the system. Since the system has already and continuously, keeps track of the total bytes as well as the number of packets for every IP address sorted in descending order it now uses that tally to choke a certain percentage of traffic. The system does this by looking at packets from IP addresses that are known to have sent bad packets in the past. If choking only these packets is not enough to bring the bandwidth down below a particular threshold level, the system chokes the next IP address on the list having the largest data volume per PTS. If this total accumulation of bytes as well as the packet rate for this IP address brings total bandwidth down to threshold level then the system stops adding IP addresses to the choke list. If the throughput still remains over threshold, more and more IP addresses are added to the choke list until the proper throughput is achieved.

During this time the system is simultaneously determining if there is a violation of any other thresholds. If the next higher threshold has been violated, then the system goes through the same process, but looking for a higher percentage level to choke. If the system goes down a threshold, then some of the IP addresses on the choke list are removed. Where the threshold levels are lowered, the cached (choked) addresses are allowed through. Once the database and cache are emptied for that threshold level, then if need be, more addresses are removed from the choke list. Process 309 & 311 control storage of data, while process 310 sends unchoked data through the system.

Another process that happens at every threshold level simultaneously is anytime a move up or down in threshold level is made, a determination is made to see if bytes that are currently being choked are still active. If they are active, then we leave them on the choke list at the next higher level. Active means that the IP address has accumulated bytes and/or packets during the last PTS. If that IP address is inactive for a PTS, meaning it has not accumulated any bytes or packets in the last PTS, then it is removed from the choke list before other IP addresses are added or removed.

Two important parameters of the system are 1) threshold percentages and 2) primary time slice. Everything happens brand new for every time slice, which advantageously is two seconds but could set to any length desired. Then the way the system prioritizes how traffic is choked is by determining how many bytes and packets are accumulated, if any, during the last PTS for each IP address.

The reason for checking to see if an IP address is still active is to prevent an attacker from continuing to change IP addresses, which could occur if "dead" IP addresses were not removed quickly from the choke list.

Figures 4, 5:
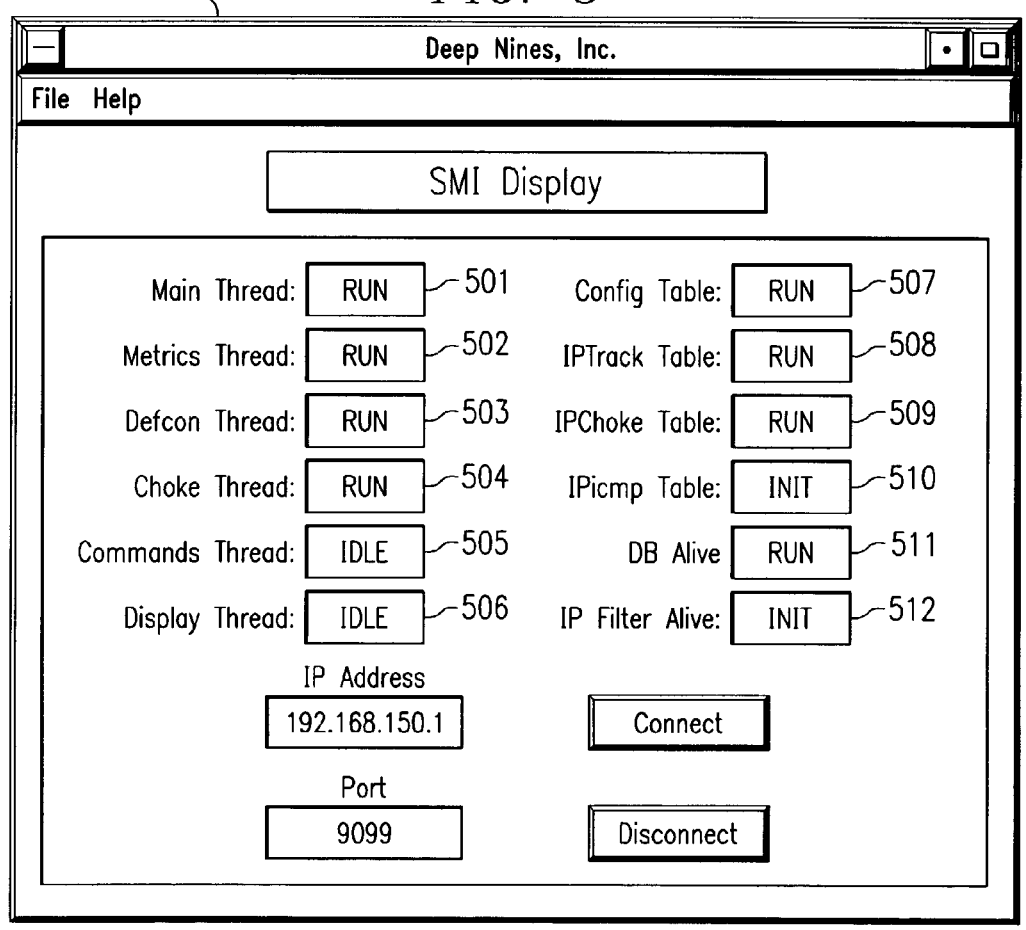

FIG. 4 is a description of what is going on during a primary time slice. There are seven processes operating in the processor for every primary time slice and these processes are repeated at 2 second intervals (assuming a 2 second PTS is selected).

The parameters for disc storage for the database storage can be determined on a customizable level, whether a user needs to store data for an extended period of time beyond the PTS expiration of active or inactive packets. The user could determine the amount of time and volume of data that they need to store and for how long and for how many PTS.

Parameters for database storage and back-up will depend upon the amount of bandwidth that is being recorded and will depend upon when the inactive list is available such as by the hour increments or daily or weekly increments to be backed up to maintain database levels for constant writing during any time of flooding traffic.

FIG. 5 shows Self Monitoring Intelligence (SMI) display 500 shows 12 components (501-512) of the systems states in real-time dynamically. There are four states for every component which can, if desired, be shown in different colors for quicker identification of system status. The colors in parenthesis (optional) are suggested colors.

Down (in red)—the component is down and NOT working—needs HELP.

Init (in blue)—the component is working and has been initialized but is currently NOT active.

Idle (in yellow)—the component is working, initialized, and running but is currently not processing data.

Run (in green)—the component is working, initialized, running, and actively processing data.

Figure 6:
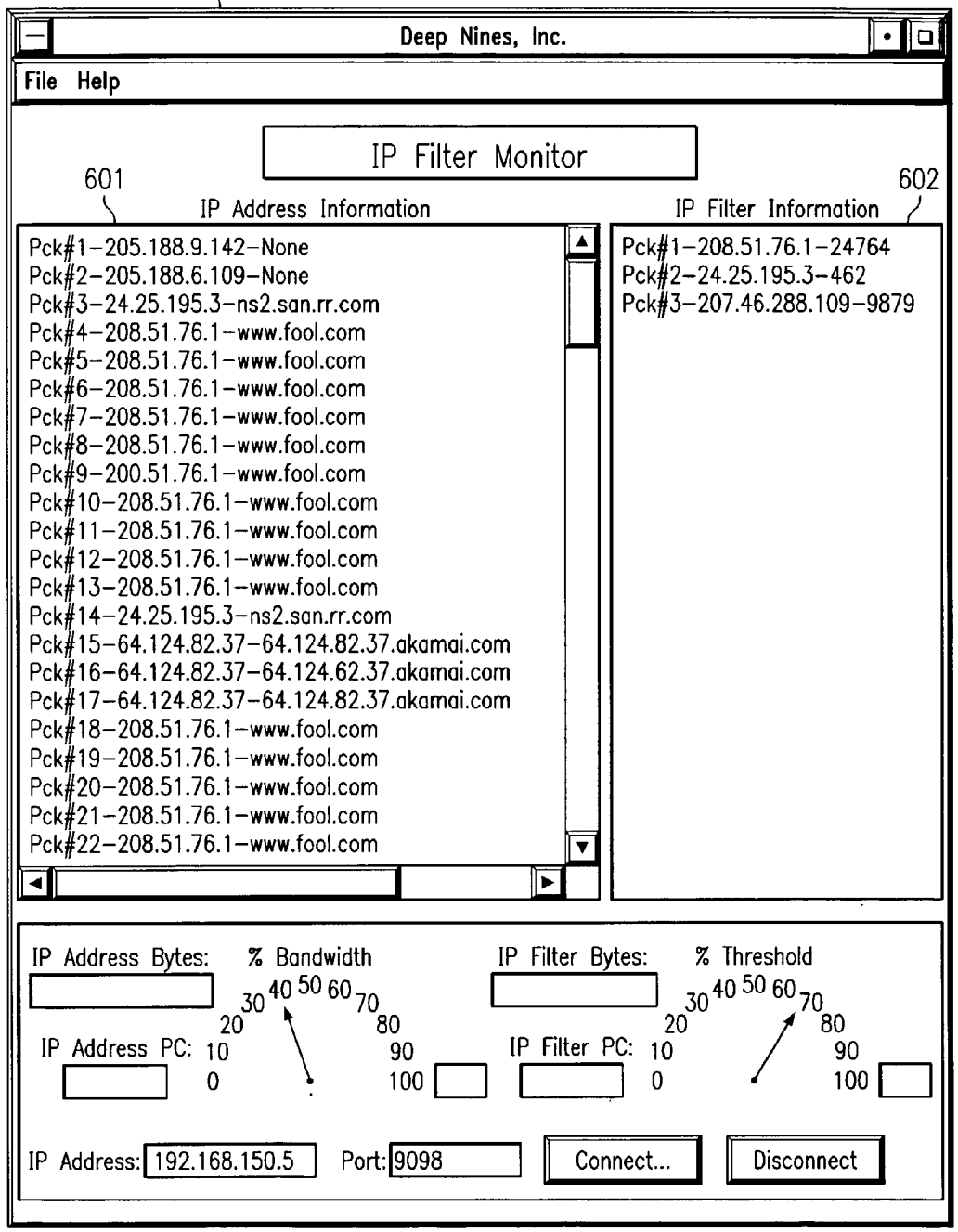

FIG. 6, shows dynamic visual IP Filter monitoring display 600. Table 601 entitled "IP Address Information" is a real-time dynamic list of each and every packet that the system sees on the internet. Table 602 entitled "IP Filter Information" is realtime dynamic list of every single packet that the system chokes.

603 is the total bytes the system has processed starting when the system was initially started.

604 is the total number of packets the system has processed starting when the system was initially started.

605 is the total number of bytes the system has choked starting when the system was initially started.

606 is the total number of packets the system has choked starting when the system was initially started.

FIG. 7, shows visual IP Tracking database management and display 700 which provides more information about each and every IP address that the system maintains. The first two columns of FIG. 7, I will call them 700a, 700b, are not shown.

700a is the IP address.

700b is the domain name associated with column 700a's IP address up to the current PTS.

701 is the total accumulated bytes that has been processed for IP address 700a.

702 is the total accumulated bytes during the current PTS for IP address 701a.

703 is the total accumulated bytes during the last PTS for IP address 701a.

704 is the accumulated bytes for IP address 701a up to the last PTS.

705 is the date in which the IP address 701a was first logged.

706 is the date the IP address 701a was last updated.

801 is a pull-down menu of data which is associated with this system's configurations.

There can be many different configurations associated with this system.

Figure 8:
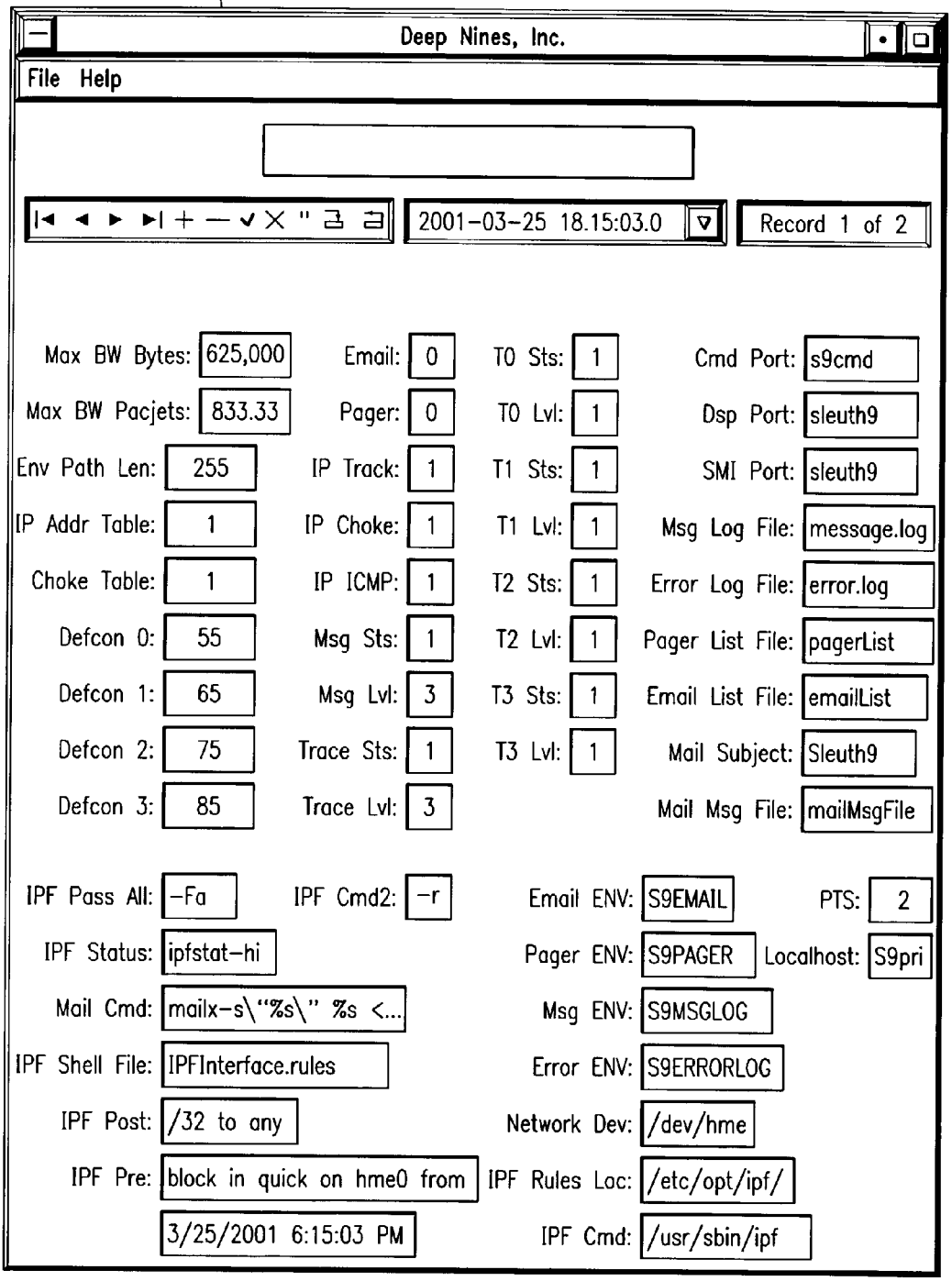

FIG. 8, shows visual management tool 800 for the system configuration database demonstrating a pull down menu of multiple configurations. The system can store as many different configurations in the database as a company would like.

Turning to FIG. 9, there is shown system 900, which, as discussed above, could be stand alone (perhaps in conjunction with FIGS. 10 and 11) or could be integrated into applications 107 (FIG. 1), and which operates when a central registry is used to check for the validity of an IP address. System 900 operates to control spoofing detection and compare 120 (FIG. 1). An Incoming packet has its IP and hardware address extracted at process 901 which then triggers a request, via process 902, to the Internet Domain Name Servers (DNS) (not shown) on the Internet through a socket API call within the software. If the DNS servers respond indicating that the identified IP address or domain name is not in the tables, no conclusion can be drawn because it could be a path down or any number of other things. Login 903 shoes this process. If the DNS servers on the Internet respond. saying "Yes, the identified IP address is in our tables a message is passed to process 906 and the system would put that information into local database 905 for future use. A good IP address signal is then generated via process 907.

If, as discussed above, the DNS search was inconclusive then process 904 searches local database 905, to see if the IP address (both software and hardware) is in the local database. If so, the system checks for a "good" or "bad" determination via process 908. A mismatch determination results in a spoofing determination 911 via process 910. If there is no match, via process 908, the system is indeterminate, box 909, and care must be taken. If a match is found in the local data base, via process 908, then a good address signal is returned via 907.

Turning now to FIG. 10, there is shown system 1000 which operates when a time stamp and/or sequencing mode is used to detect spoofing. As discussed above with respect to FIG. 9, when traffic comes from the Internet, the IP and hardware address is extracted from the header and the hardware address is ascertained via process 1001 (which could, of course, be the same process as box 901). Step 1002 determines if those entries are in the database (or memory) 1003. If they are in the local data base (or memory), the system progresses to step 1004. If the address pair is not in the database, it is inserted via process 1005 with a date and time stamp and with a sequence number.

If the address pair is in the database, as determined at step 1004, then the system compares the newly arriving address pair with the last arrived (and stored) pair to determine if a proper relationship exists. If, at process 1004, a comparison reveals a proper relationship, it is good traffic and the data is passed on via process 1006. If, on the other hand, the sequence (or date/time) is wrong, it is possible spoofing (process 1007). At this point the system is unsure since the user could have recently swapped out their hardware cards or switched machines. The system, via process 1008, then compares the time stamps, the quantities, and/or the sequence numbers of the stored entry with the new entry coming in. If the time stamp (TS) has changed and remains changed and if the dates have changed and are not going back and forth, then the presumption is that somebody has changed his/her, and the system assumes that it is good traffic via process 1009. If, however, there has been a fluctuation of hardware IP address associations back and forth over a short period of time, the assumption is spoofing, box 1010.

Procedure 1008 also checks to see if one hardware address is being associated with multiple IP addresses over a predetermined time interval. If so, the presumption is that that IP address has been spoofed.

Figure 11:
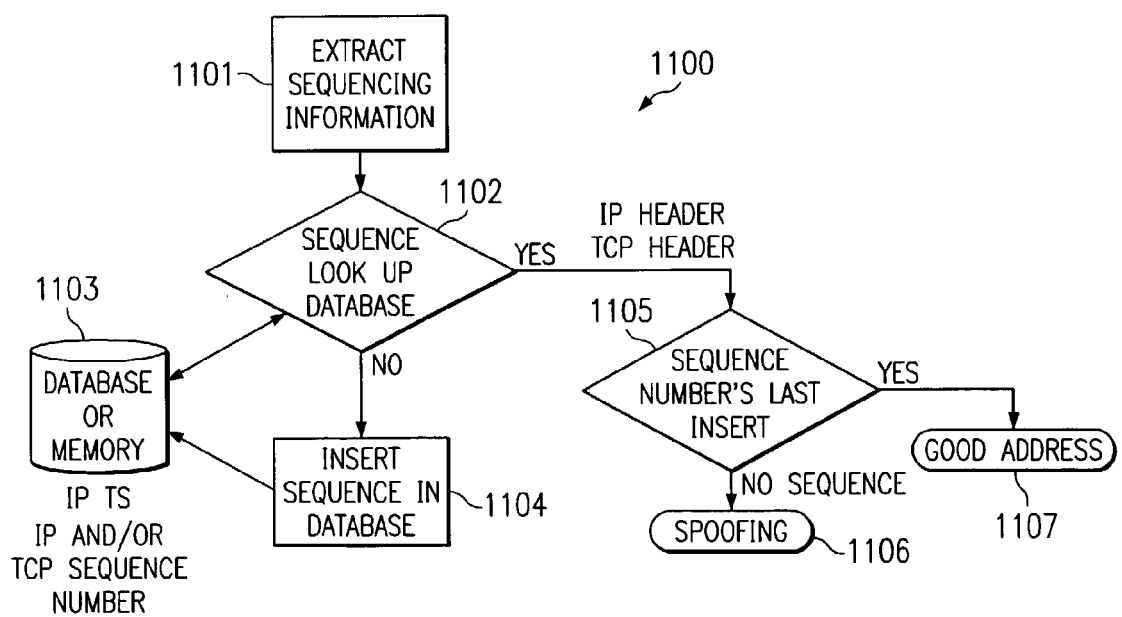

Turning now to FIG. 11 (which is shown on the same drawing sheet with FIG. 2), there is shown system 1100, which is a third technique for detecting spoofing. As traffic comes into the system the sequence numbers are extracted via process 1101, out of the IP header and/or the TCP header. The extracted sequence numbers are then compared, via process 1102, to see if they are already in local database/memory 1103. If they are not in the database, the system inserts them via process 1104. If they are in the database, then, process 1105 compares the arriving sequence numbers and time intervals with the last ones that were inserted into the database. If the sequence is wrong, the system knows that it is being spoofed via process 1106. If the sequence is right then, at process 1107, a good address signal is generated.

When the IP address comes from a local (within the same system) hardware, an optional method of determining if an equipment address is valid with respect to an associated IP is to send a Reverse Address Resolution Protocol request to all hardware on the local subnet. Each piece of hardware will then reply immediately with its hardware address. This allows for an association to be made immediately between the hardware address and the IP address.

The processes discussed with respect to FIGS. 9-11 are examples of spoofing detection. They can be used independently from each other, or in combination, to develop a level of confidence that certain packets are "good" and certain are "bad". Also, because some of the processes described yield indeterminable results, it may be inappropriate to take drastic action on such packets. However, when combined with the system described with respect to FIGS. 1-8, the spoofing determination can be an additional parameter to check when it is desired to store certain data based on threshold levels of the system.

Thus, when different thresholds of throughput arise, the amount of certainty (or uncertainty) of a spoofed address with respect to a certain packet can be used, if desired, to help select which packets are stored in temporary storage and which are allowed to pass.

Also, once data is sent to temporary storage and the thresholds have been reduced, decisions may be made as to which data, if any, should be allowed into the system. This also can be decided based upon a "probability" of spoofing for each packet as determined by the processes described in FIGS. 9-11. These probabilities can be calculated and stored for each data packet or for certain address locations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. The method of controlling a traffic management system, said method comprising the steps of:
    reviewing certain parameters of data packets flowing into said system, said parameters pertaining to possible spoofing;
    remembering for a period of time said reviewed certain parameters in conjunction with each received data packet; and
    upon attainment of packet flow volume into said system reaching a certain level, temporarily storing certain subsequently received packets in accordance with selective remembered parameter of previously received packets.

2. The method of claim 1 wherein said certain level is user controlled.

3. The method of claim 1 wherein said certain level includes a plurality of levels, wherein the attainment of each successive level results in a more stringent application of said remembered certain parameters.

4. The method of claim 1 wherein said remembered parameters include one or more of: a sender's software address; a sender's hardware address; a prior trouble causing address; a notice of a potential trouble address; amount of data transmitted from a particular address in a period of time; number of packets arriving from a particular address in a period of time; an address' domain name; date of initial encounter with an address; date of latest encounter with an address, a sequence number of a transaction; a time stamp of a transaction.

5. The method of claim 4 wherein said certain level includes a plurality of levels arranged in a sequence, and wherein as the sequence of levels gets closer to an absolute maximum data flow rate more and more of said remembered parameters are included as a basis for said determination to temporarily store a particular packet.

6. The method of claim 5 further including the step of:
    arbitrarily selecting packets for temporary storing when said data flow rate reaches its maximum capacity.

7. The method of claim 1 further including the step of:
    retrieving said temporarily stored data packets when traffic flow into said system falls below said certain level.

8. The method of claim 7 further including the step of:
    putting at least some of said retrieved data packets through said system.

9. The method of claim 1 further comprising the step of:
    dynamically displaying information pertaining to temporarily stored ones of said data packets.

10. The method of claim 9 wherein said displaying step includes:
    transmitting said display information to a remote location.

* * * * *